United States Patent
Masui (10) Patent No.: US 8,272,047 B2
(45) Date of Patent: Sep. 18, 2012

(54) INFORMATION PROCESSING APPARATUS, INFORMATION PROCESSING SYSTEM, RECORDING MEDIUM AND INFORMATION PROCESSING METHOD

(75) Inventor: Takanori Masui, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1000 days.

(21) Appl. No.: 12/128,719

(22) Filed: May 29, 2008

(65) Prior Publication Data

US 2009/0100515 A1  Apr. 16, 2009

(30) Foreign Application Priority Data

Oct. 12, 2007 (JP) ................................. 2007-266629

(51) Int. Cl.
G06F 21/00 (2006.01)

(52) U.S. Cl. ..................... 726/16; 726/18; 726/2; 726/4; 726/6; 713/168; 713/170; 713/182; 713/186; 380/44; 380/45

(58) Field of Classification Search ....................... 726/16
See application file for complete search history.

(56) References Cited

U.S. PATENT DOCUMENTS

| | | | | |
|---|---|---|---|---|
| 7,434,063 B2* | 10/2008 | Watanabe | ...................... | 713/186 |
| 7,478,421 B2* | 1/2009 | Kodimer et al. | .................... | 726/4 |
| 7,500,262 B1* | 3/2009 | Sanin et al. | ......................... | 726/2 |
| 7,584,263 B1* | 9/2009 | Hicks et al. | .................... | 709/217 |
| 7,900,252 B2* | 3/2011 | Kawano et al. | ................. | 726/18 |
| 2002/0169874 A1* | 11/2002 | Batson et al. | ................. | 709/225 |
| 2003/0140230 A1* | 7/2003 | de Jong et al. | ................ | 713/182 |
| 2003/0233440 A1* | 12/2003 | Nakamura et al. | ............ | 709/223 |
| 2005/0183141 A1* | 8/2005 | Sawada | ............................. | 726/16 |
| 2007/0061573 A1* | 3/2007 | Dokuni et al. | ................ | 713/170 |
| 2007/0186106 A1* | 8/2007 | Ting et al. | ....................... | 713/168 |
| 2007/0208827 A1* | 9/2007 | Fukui et al. | .................... | 709/219 |
| 2007/0214508 A1* | 9/2007 | Fukui et al. | ..................... | 726/28 |

FOREIGN PATENT DOCUMENTS

| | | |
|---|---|---|
| CN | 1933401 A | 3/2007 |
| JP | 11338985 | 12/1999 |
| JP | 2007079684 | 3/2007 |

OTHER PUBLICATIONS

English Translation of Japanese Office Action issued in corresponding Japanese Application No. 2007-266629 mailed on Nov. 30, 2010.
Chinese Office Action issued in Chinese with English translation thereof, Application No. 200810137749.5, issued on Jun. 9, 2011.

* cited by examiner

Primary Examiner — Kambiz Zand
Assistant Examiner — Yonas Bayou
(74) Attorney, Agent, or Firm — Gesmer Updegrove LLP (57) ABSTRACT

A receiving unit receives information selected by a user on an operating screen. A detecting unit detects a function executing part corresponding to the information received by the receiving unit. A determining unit determines that the user authentication is required when a function is to be executed, when "the user authentication is required" is set for at least any one of a function allocated to a function executing part that is detected by the detecting unit, the function allocated to another function executing part, and the operating screen that includes the function executing part to which the function is allocated. A function executing unit executes a function allocated to the function executing part selected by the user, wherein the user is authorized to execute the function.

14 Claims, 8 Drawing Sheets

MENU INFORMATION TABLE

| MENU ID | AUTHENTICATION REQUIREMENT INFORMATION | BUTTON ID |
|---|---|---|
| m0(MAIN) | 0 | |
| m1 | 2 | b1,b2,b3,b9 |
| m2 | 0 | b1,b4,b5,b10,b11,b12 |
| m3 | 0 | b2,b5,b7,b10 |

FIG. 4

FUNCTION BUTTON INFORMATION TABLE

| BUTTON ID | FUNCTION ID | AUTHENTICATION REQUIREMENT INFORMATION | BASIC FUNCTION ID |
|---|---|---|---|
| b1 | f1 | 0 | |
| b2 | f2 | 0 | |
| b3 | f3 | 0 | |
| b4 | f4 | 2 | |
| b5 | f5 | 0 | |
| b6 | f6 | 0 | |
| b7 | f7 | 0 | |
| b8 | f8 | 2 | |
| b9 | c1 | 0 | f7,f1 |
| b10 | c2 | 2 | f2,f4 |
| b11 | c3 | 0 | f5,f6,f8 |
| b12 | c4 | 0 | f7,f6 |

FUNCTION BUTTON INFORMATION TABLE

| BUTTON ID | FUNCTION ID | AUTHENTICATION REQUIREMENT INFORMATION | AUTHENTICATED INFORMATION | BASIC FUNCTION ID |
|---|---|---|---|---|
| b1 | f1 | 0 | 1 | |
| b2 | f2 | 0 | 1 | |
| b3 | f3 | 0 | 1 | |
| b4 | f4 | 2 | 0 | |
| b5 | f5 | 0 | 0 | |
| b6 | f6 | 0 | 0 | |
| b7 | f7 | 0 | 0 | |
| b8 | f8 | 2 | 0 | |
| b9 | c1 | 0 | 1 | f7,f1 |
| b10 | c2 | 2 | 0 | f2,f4 |
| b11 | c3 | 0 | 0 | f5,f6,f8 |
| b12 | c4 | 0 | 0 | f7,f6 |

FIG. 8

FUNCTION BUTTON INFORMATION TABLE

| BUTTON ID | FUNCTION ID | AUTHENTICATION REQUIREMENT INFORMATION | BASIC FUNCTION ID |
|---|---|---|---|
| b1 | f1 | 1 | |
| b2 | f2 | 1 | |
| b3 | f3 | 1 | |
| b4 | f4 | 2 | |
| b5 | f5 | 0 | |
| b6 | f6 | 0 | |
| b7 | f7 | 0 | |
| b8 | f8 | 2 | |
| b9 | c1 | 1 | f7,f1 |
| b10 | c2 | 2 | f2,f4 |
| b11 | c3 | 0 | f5,f6,f8 |
| b12 | c4 | 0 | f7,f6 |

FIG. 9

| AUTHENTICATION REQUIRED FUNCTION LIST |
|---|
| f1 |
| f2 |
| f3 |
| f4 |
| f8 |
| c2 |
| |
| c1 |
| c3 |

FIG. 10

INFORMATION PROCESSING APPARATUS, INFORMATION PROCESSING SYSTEM, RECORDING MEDIUM AND INFORMATION PROCESSING METHOD

CROSS-REFERENCE TO RELATED APPLICATIONS

This application is based on and claims priority under 35 USC 119 from Japanese Patent Application, No. 2007-266629 filed on Oct. 12, 2007.

BACKGROUND

1. Technical Field

The present invention relates to an information processing apparatus, an information processing system, a recording medium and an information processing method.

2. Related Art

As more and more functions have become available for image processing apparatuses which provide various functions like a multiple function processing machine, an increasingly greater number of operating parts (operating buttons) have been provided for the apparatuses. As a result, it has become impossible for the apparatuses to display all the operating buttons on one operating screen displayed on a display screen (for example, an operating panel) at a time. Generally, the apparatuses are adapted to allocate the operating buttons to plural operating screens and hierarchically manage the operating screens to cope with the matter. The apparatuses are adapted to enable a user to display and select a desired operating button by switching operating screens displayed on the operating panel.

Some image processing apparatuses have been provided with a function of changing a default setting of the apparatuses according to user's intention (hereinafter referred to as a "customizing function"). The apparatuses enable the user to customize the operating screens by using the customizing function. Some of the apparatuses enable the user to combine plural basic functions to generate one combined function and allocate the generated combined function to one operating button by using the customizing function. For example, some apparatuses serially provide plural basic functions in one operation such that the user can transfer image data scanned by a scanner to a specified destination by facsimile, by enabling the user to allocate a combined function, which is a combination of two basic functions of a scanning function and a facsimile function, to an operating button (hereinafter referred to as a "combined function button" and operate the combined function button.

A user is not allowed to use all of the functions provided by the image processing apparatuses in some circumstances, however. Many of the apparatuses are provided with a security guard such as requiring a user to be authenticated to use the apparatuses. Each of the apparatuses is adapted to be set whether it requires a user to be authenticated for each of the operating buttons and each of the operating screens when the operating screens are generated. If the apparatus is set to require a user to be authenticated when the user is to operate an operating button, that operating button is allocated to a predetermined operating screen and then set to require user authentication. When the user selects the operating button to which a function limited for the user is allocated (hereinafter referred to as an "authentication required function button"), the apparatus requires user authentication, such as by displaying a user authentication confirmation screen for prompting the user to input a user ID and a password.

In the related arts, whether the user authentication is required or not is set for each of buttons each time the button is allocated. If the setting is incompletely done, it results in such inconsistency as the user authentication being required when a certain operating button is operated but not required when another operating button is operated.

SUMMARY

According to an aspect of the invention, there is provided an information processing apparatus including a receiving unit that receives information selected by a user on an operating screen; a detecting unit that detects a function executing part corresponding to the information received by the receiving unit; a memory that stores information on whether user authentication is required or not that is set for an operating screen and a function allocated to each function executing part included in the operating screen; a determining unit that determines whether the user authentication is required or not based on the information on whether the user authentication is required or not that is stored in the memory when the function allocated to the function executing part is executed; a user authenticating unit that executes the user authentication when the user selects the function executing part for which it is determined that "the user authentication is required" by the determining unit; and a function executing unit that executes a function allocated to the function executing part selected by the user, wherein the user is authorized to execute the function; wherein the determining unit determines that the user authentication is required when a function is executed, when "the user authentication is required" is set to at least any one of a function allocated to a function executing part that is detected by the detecting unit, the function allocated to another function executing part, and the operating screen that includes the function executing part to which the function is allocated.

BRIEF DESCRIPTION OF THE DRAWINGS

Exemplary embodiments the present invention will be described in detail based on the following figures, wherein.

DETAILED DESCRIPTION

An exemplary embodiment of the present invention will be described with reference to the drawings.

Figure 1:
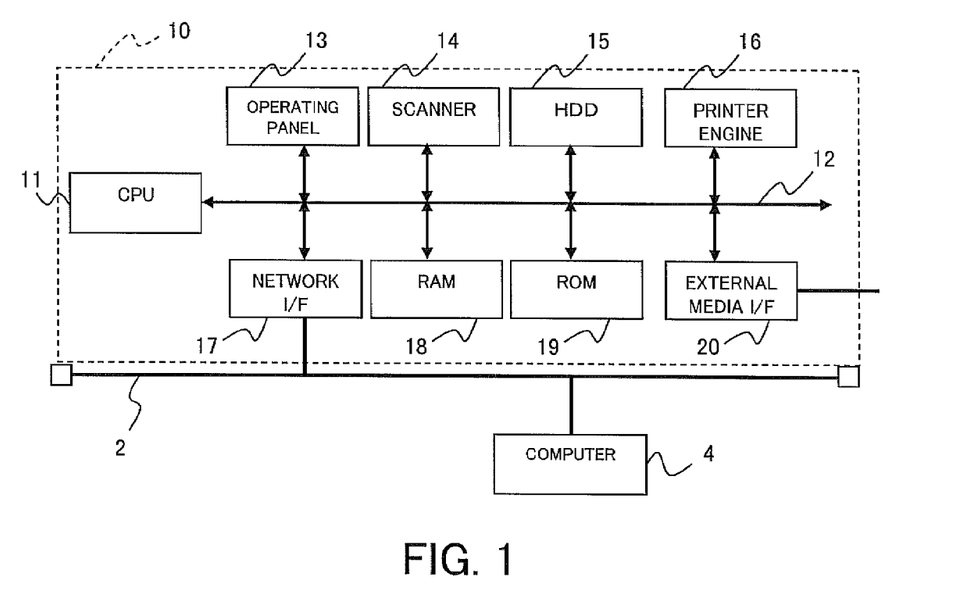
FIG. 1 is a hardware configuration diagram showing an image processing apparatus of an exemplary embodiment.

FIG. 1 is a hardware configuration diagram showing an image processing apparatus of an exemplary embodiment. An image processing apparatus 10 in the exemplary embodiment is assumed to be mounted with at least one of various functions including a copying function, a scanner function and a facsimile communicating function. The image processing apparatus 10 has a built-in computer, which is an information processing apparatus. In FIG. 1, a CPU 11 provides various functions for a user by controlling operations of each mechanism that is mounted on the apparatus such as a scanner 14 and a printer engine 16 according to a program stored in a ROM 19. An address and data bus 12 connects with each mechanism to be controlled by the CPU 11 and communicates data. An operating panel 13 is an example of a display screen for receiving an instruction from the user and displaying information. The scanner 14 scans a manuscript set by the user and stores it as electronic data in storage such as an HDD (Hard Disk Drive) 15. The HDD 15 stores an electronic document and the like that is scanned via the scanner. The printer engine 16 prints an image on a sheet of printing paper according to an instruction from a control program that is executed by the CPU 11. A network interface (I/F) 17 connects with a network 2 and is used in transmitting electronic data generated by the apparatus to another computer 4 by electronic mail or facsimile, receiving electronic mail transmitted to the apparatus or electronic data transferred by facsimile from another computer, or accessing to the apparatus via a browser. A RAM 18 is used as a work memory when a program is executed or as a communication buffer when electronic data is transmitted and received. The ROM 19 stores various programs for controlling the apparatus, encrypting electronic data and transmitting and receiving electronic data. In response to execution of each of the programs, each of the components to be described later exerts a predetermined processing function. An external media interface (I/F) 20 is an interface with an external memory device such as a USB memory or a flash memory.

Figure 2:
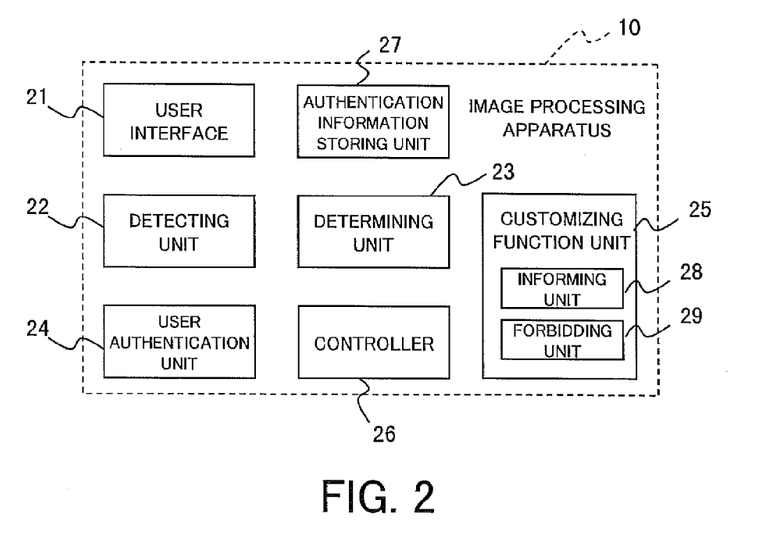
FIG. 2 is a block diagram of the image processing apparatus of the exemplary embodiment.

FIG. 2 is a block diagram of the image processing apparatus 10 in the exemplary embodiment. The image processing apparatus 10 includes a user interface 21, a detecting unit 22, a determining unit 23, a user authentication unit 24, a customizing function unit 25, a controller 26 and an authentication information storing unit 27. FIG. 2 shows components necessary for describing the exemplary embodiment.

The image processing apparatus 10 in the exemplary embodiment hierarchically manages plural operating screens displayed on the operating panel 13 as in the conventional art but has the user interface 21 display an operating screen on the operating panel 13 where the operating screen is selected from the plural operating screens in the hierarchical structure in response to a user's screen switching operation. The user interface 21 also receives a user's input on the displayed screen. The user interface 21 is embodied by incorporation of the operating panel 13 and software for controlling input/output of the operating panel 13. The detecting unit 22 detects a function executing part that is selected by the user from function executing parts included in the operating screen that is displayed on the operating panel 13.

A GUI (Graphical User Interface) is generally used for generating an operating button included in the operating screen. The function executing part referred to by the exemplary embodiment is an operating button, to which each of various functions including a copying function and a scanning function provided for the image processing apparatus 10 is allocated, among the operating buttons, which is a kind of GUI component. Therefore, when the operating button is selected, a function that is allocated to the selected operating button is generally started, with some kinds of setting to the operating button perhaps requiring user authentication before executing the function. In the description below, the function executing part is generally called a "function button". As mentioned above, when various functions including a copying function and a scanning function provided for the image processing apparatus 10 are called "basic functions", a combined function of the plural basic functions is called a "combined functions". The combined function can be allocated to an operating button as mentioned above. The operating button to which the combined function is allocated is particularly called a "combined function button".

The authentication information storing unit 27 stores the information on whether the user authentication is required or not that is set when a function allocated to each function button is executed. The determining unit 23 determines whether the user authentication is required or not with reference to the information registered in the authentication information storing unit 27 when a function allocated to a function button is executed. The user authentication unit 24 executes the user authentication when the user selects a function button for which it is determined that the user authentication is required by the determining unit 23. Here, the user authentication is assumed as processing of displaying an authentication screen on the operating panel 13. The authentication screen is for prompting the user to input the user ID and the password, which is the identification information of the user. The customizing function unit 25 customizes operating screens to be displayed on the operating panel 13, definition of hierarchy of the operating screens, generation of the combined function button, and the like, by using the customizing function that is provided for the image processing apparatus 10. Here, the term 'customize' refers to changing a default setting of the model according to user's intention. The customizing function unit 25 in the exemplary embodiment provides a new function in conjunction with an informing unit 28 and a forbidding unit 29, as well as the conventional customize function. The new function will be detailed later. The controller 26 controls overall operations of the components included in the image processing apparatus 10.

The components 21 to 26 of the image processing apparatus 10 are implemented by cooperative operation of mounted devices such as a computer and the scanner 14 mounted on the image processing apparatus 10, and a program to be operated in the CPU 111 that is mounted on the computer. The authentication information storing unit 27 is embodied by the HDD 15 or the RAM 18 which are mounted on the image processing apparatus 10.

A program to be used in the exemplary embodiment can be provided by being stored on a computer readable recording medium such as a CD-ROM and a DVD-ROM, as well as via a communication system. The program provided via a communication system or from a recording medium is installed in the computer. As the CPU 11 of the computer executes the installed program, various processing is implemented.

Figure 3:
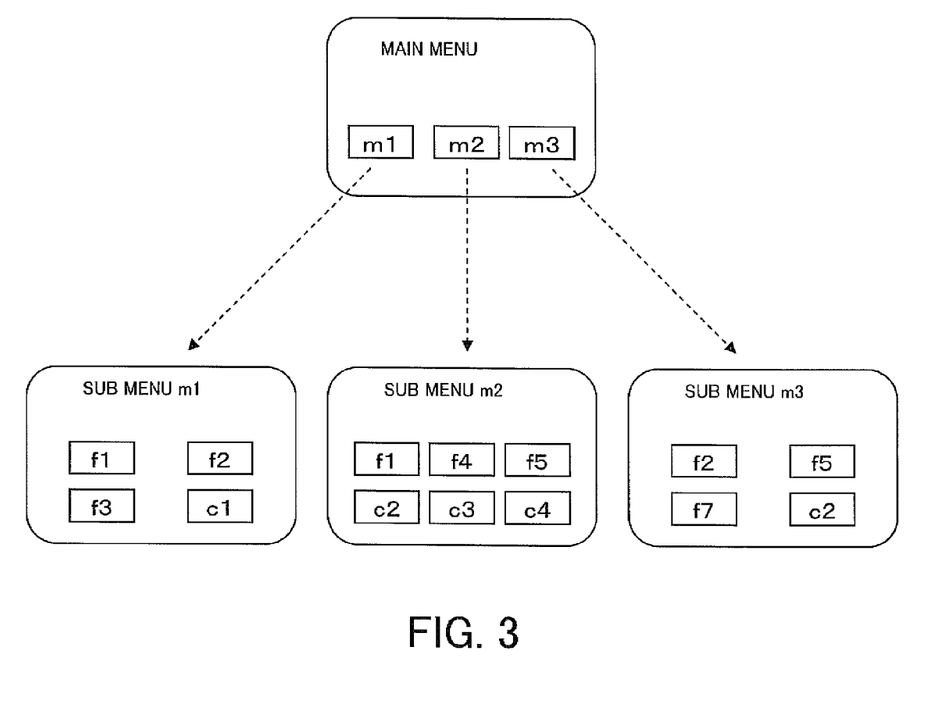
FIG. 3 is a schematic diagram showing screens displayed on an operating panel of the image processing apparatus of the exemplary embodiment, hierarchy of the screens, and relationships between operating buttons included in each menu screen.

FIG. 3 is a schematic diagram showing screens displayed on the operating panel 13 of the image processing apparatus 10, hierarchy of the screens, and a relationship between operating buttons included in each menu screen. In FIG. 3, a main menu screen has three sub menu buttons m1, m2, and m3 arranged thereon. When the sub menu button m1 is selected, a sub menu m1 is displayed with function buttons, to each of which functions f1, f2, f3 and c1 are allocated, arranged thereon. When the sub menu button m2 is selected, a sub menu m2 is displayed with function buttons, to each of which functions f1, f4, f5, c2, c3 and c4 are allocated, arranged thereon. When the sub menu button m3 is selected, a sub menu m3 is displayed with function buttons, to each of which functions f2, f5, f7 and c2 are allocated, arranged thereon.

Figure 4:
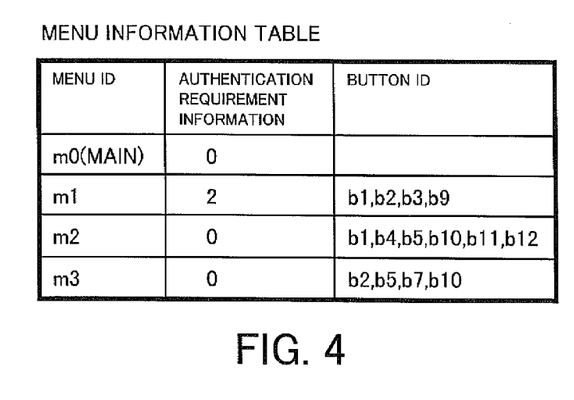
FIG. 4 is a diagram showing an exemplary data structure of a menu information table of the exemplary embodiment.

FIG. 4 is a diagram showing an exemplary data structure of a menu information table of the exemplary embodiment. The menu information table is generated in a customizing process and registered in the authentication information storing unit 27. In the menu information table, a menu ID for identifying a menu included in the operating screen, a button ID for identifying an operating button allocated to the menu, and authentication requirement information are set for each menu in association with each other. FIG. 4 shows an example corresponding to a structure of the operating screen shown in FIG. 3. The authentication requirement information is the information referenced by the determining unit 23 in determining whether or not the user authentication is to be required for the operating user when the user selects a corresponding operating button of a menu or a function. In FIG. 4, "2" means an operating button that is set in advance as requiring authentication in a customizing process, and "0" means an operating button that is set in advance as not requiring authentication in a customizing process.

Figure 5:
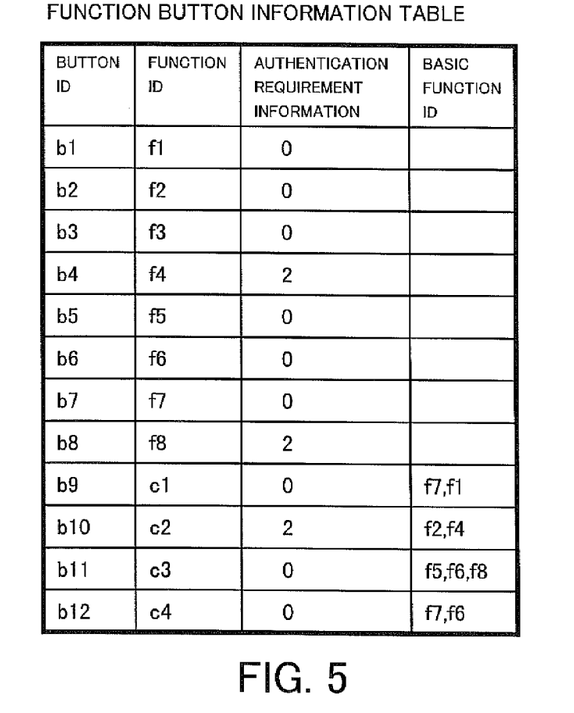
FIG. 5 is a diagram showing an exemplary data structure of a function button information table of the exemplary embodiment.

FIG. 5 is a diagram showing an exemplary data structure of a function button information table in the exemplary embodiment. The function button information table is generated in a customizing process and registered in the authentication information storing unit 27. In the function button information table, a button ID for identifying a function button, a function ID for identifying a function allocated to the button, authentication requirement information, and a basic function ID are set for each function button in association with each other. The authentication requirement information has been described above. When the function button is a combined function button, function IDs of combined basic functions are set to the basic function IDs. When function ID is set in the basic function ID column on the function button information table, it can be recognized that the function button is the combined function button. In the exemplary embodiment, the function ID of the basic function starts with "f" and the function ID of the combined function starts with "c" for simplifying distinction between the basic function and the combined function.

Operations of the exemplary embodiment will be described with reference with the flowcharts shown in FIG. 6 and FIG. 7. Determination as to whether the operating user is required to be authenticated when the user selects each of the operating buttons will be mainly described below. In the description below with reference to the flowcharts, the processes described once will be simply described as required.

It is assumed that a user who wants to use a function provided by the image processing apparatus 10 selects an operating button of the sub menu m1 on the main menu displayed on the operating panel 13.

The user interface 21 receives the operation on the operating panel 13. When the detecting unit 22 detects that the operation is selection of the sub menu m1 (step 110), the determining unit 23 executes user authentication requirement determination to be described below (step 120).

Figure 7:
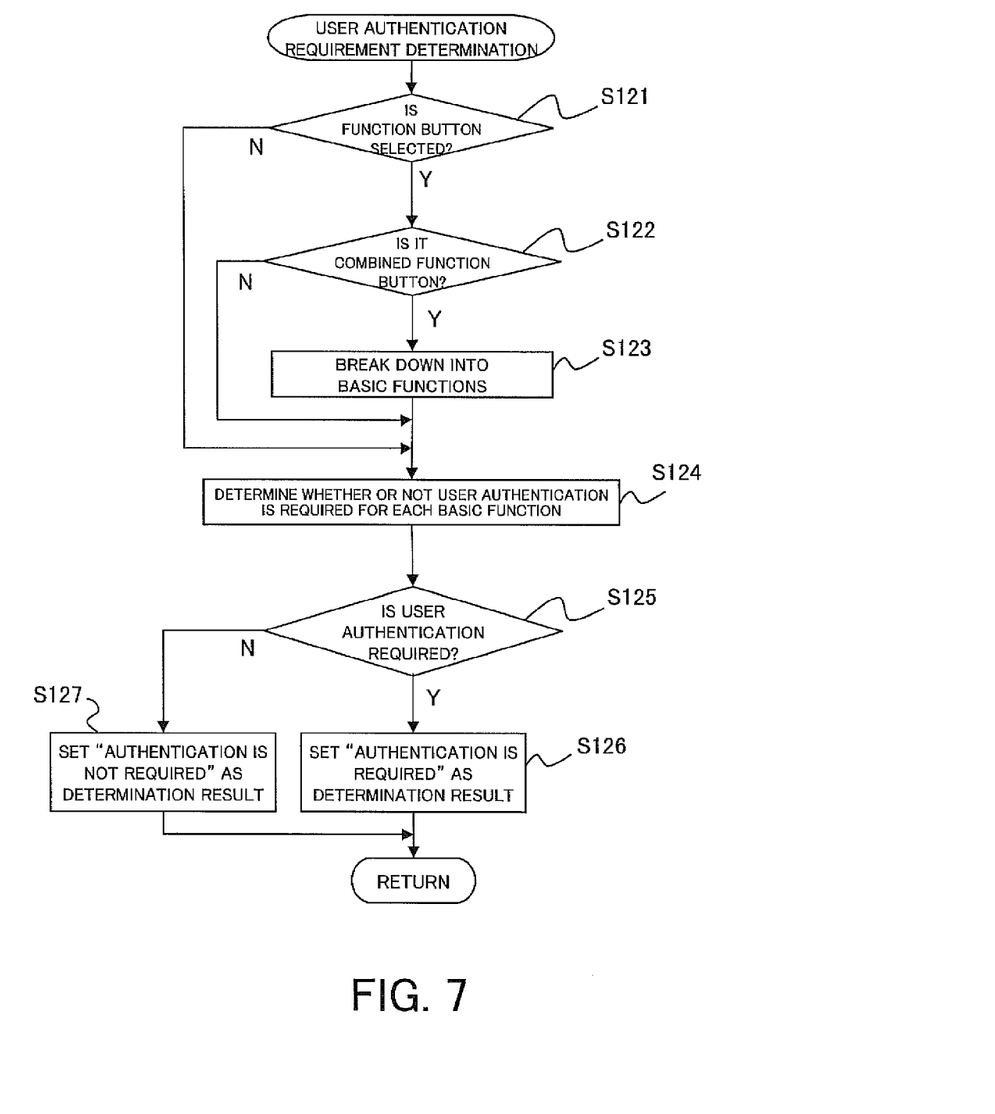
FIG. 7 is a flowchart showing user authentication requirement determination shown in FIG. 6.

Specifically, referring to FIG. 7, when the operating button selected by the user is the operating button of the sub menu m1 instead of a function button (N at step 121), the determining unit 23 can recognize that the user authentication is required with reference to the authentication requirement information on the sub menu m1 that is set in the menu information table. Accordingly, the determining unit 23 determines that the user authentication is required (step 124). As a result of the determination, "authentication is required" is set (Y at step 125, step 126).

Figure 6:
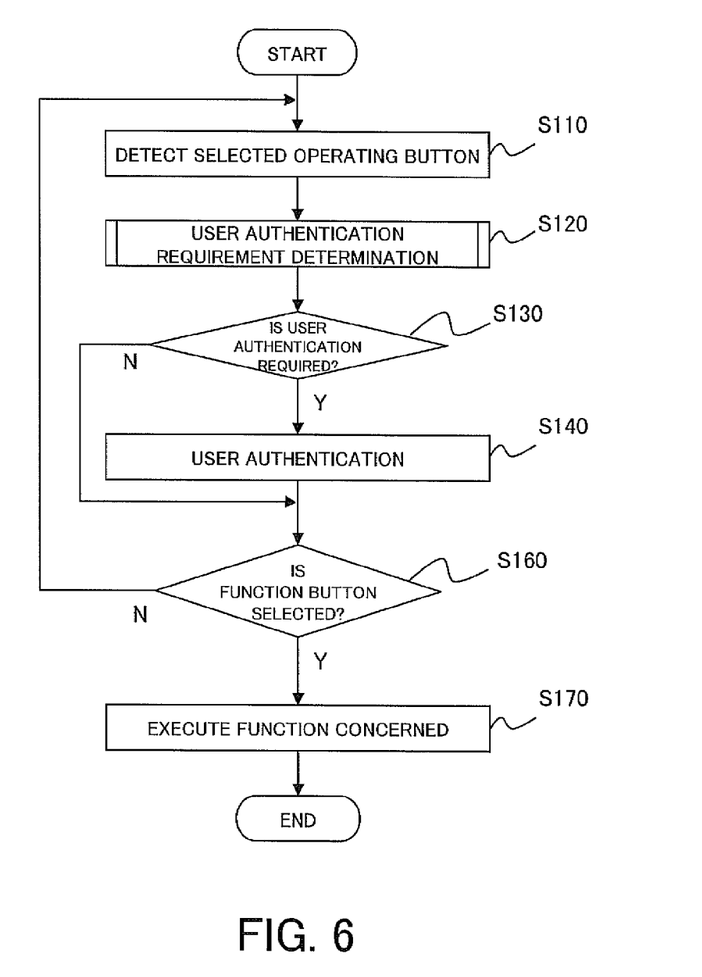
FIG. 6 is a flowchart showing operations of the exemplary embodiment.

In FIG. 6, as it is determined that "authentication is required" at the user authentication requirement determination (Y at step 130), the user authentication unit 24 displays a predetermined authentication screen on the operating panel 13 for requiring the user authentication (step 140). Here, it is assumed that the user authentication succeeded.

As the user authentication succeeded, the operating panel 13 will display the sub menu m1. As the operating button of the sub menu m1 is not a function button (N at step 160), the apparatus waits for an operating instruction from the user.

If the user selects a function button b1, to which the function f1 is allocated, on the sub menu m1 next, the determining unit 23 determines whether the user authentication is required or not in the manner shown below (steps 110, 120).

Specifically, referring to FIG. 7, when the operating button selected by the user is the function button b1 (Y at step 121) and not a combined function button (N at step 122), the determining unit 23 can recognize that the user authentication is not required with reference to the authentication requirement information on the function button b1 that is set in the function button information table. Here, however, the determining unit 23 determines that the user authentication is not required because the user authentication has been executed when the sub menu m1 is selected as well as determination based on the authentication requirement information (step 124). As a result of the determination, "authentication is not required" is set (N at step 125, step 127).

Figure 8:
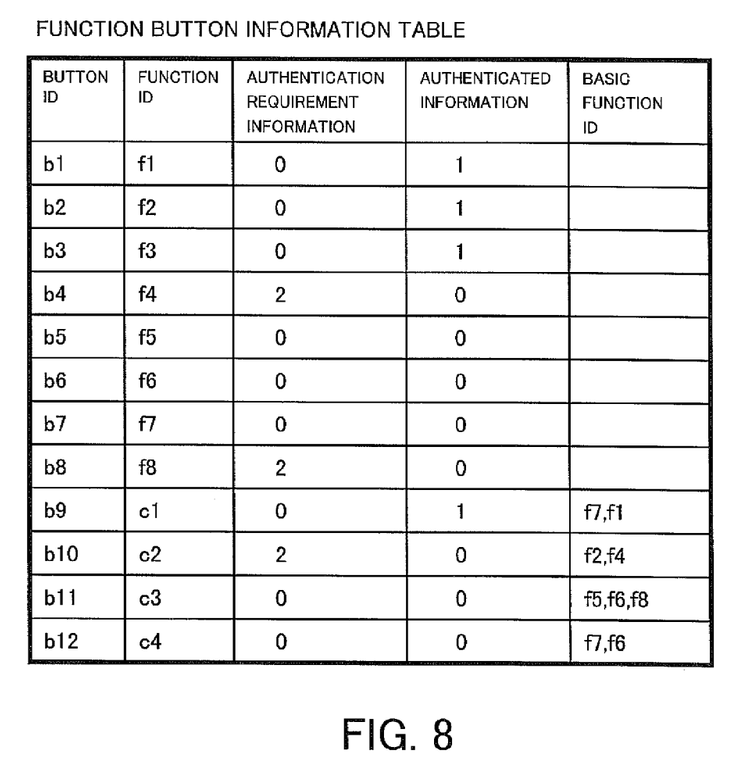
FIG. 8 is a diagram showing an exemplary data structure of the function button information table in which authenticated information is further associated with each function button in the exemplary embodiment.

The menu that includes the selected function button b1 can be recognized with reference to the information on a user's operation history that is collected by the image processing apparatus 10. Accordingly, whether the user authentication has been executed or not can be determined based on the information. Alternatively, the apparatus can be adapted to set that it can omit the user authentication thereafter by using the function button information table or the like, as the user authentication has been executed for the functions f1, f2, f3 and c1. FIG. 8 shows an exemplary data structure of the function button information table in the case. As exemplified in FIG. 8, authentication executed information is further associated with each function button. When the controller 26 confirms that the user authentication succeeded at the user authentication at step 140, it extracts executable functions f1, f2, f3 and c1 on the sub menu m1 with reference to the menu information table, and sets "1", indicating that the user authentication has been executed, in each of authentication executed information of the functions f1, f2, f3 and c1 on the function button information table. The determining unit 23 determines that authentication is not required for the function f1 with reference to the authentication executed information in determining whether the user authentication is required or not.

In FIG. 6, as it is determined that "authentication is not required" in the user authentication requirement determination (N at step 130), the user authentication is not required. As the function button b1 is selected here, the corresponding function f1 is executed (step 170).

When the user selects the function buttons b2, b3 and b9 to each of which each of the functions f2, f3 and c1 is allocated on the sub menu m1, it is determined that the user authentication is not required, as in the case where the function button b1 to which the function f1 is allocated is selected, and each function is executed.

Then, it is assumed that a user who wants to use a function provided by the image processing apparatus 10 newly selects an operating button of the sub menu m2 on the main menu displayed on the operating panel 13. The determining unit 23 determines whether or not the user authentication is required in the manner below (steps 110, 120).

Specifically, referring to FIG. 7, when the operating button selected by the user is the sub menu m2 (N at step 121), the determining unit 23 can recognize that the user authentication is not required with reference to the authentication requirement information on the sub menu m2 that is set in the menu information table. Accordingly, the determining unit 23 determines that the user authentication is not required (step 124). As a result of the determination, "authentication is not required" is set (N at step 125, step 127).

In FIG. 6, as it is determined that "authentication is not required" in the user authentication requirement determination (N at step 130) and a function button is not selected (N at step 160), the apparatus waits for an operating instruction from the user.

If the user selects the function button b1, to which the function f1 is allocated, on the sub menu m2, the determining unit 23 next determines whether or not the user authentication is required in a manner shown below (steps 110, 120).

Specifically, referring to FIG. 7, as the operating button selected by the user is the function button b1 (Y at step 121) and not a combined function button (N at step 122), the determining unit 23 can recognize that the user authentication is not required with reference to the authentication requirement information on the function button b1 that is set in the function button information table. The determining unit 23 further confirms the information below. First, it checks the presence of a combined function whose basic function is the function f1 that is allocated to the function button b1. In the example shown in FIG. 5, the function f1 is included in the combined function c1. If the determining unit 23 checks whether the user authentication is required or not for the combined function c1, it can recognize that the user authentication is not required from the fact that "0" is set in the corresponding authentication requirement information. The determining unit 23 further checks the presence of a menu that includes the function button b1. Referring to the example shown in FIG. 4, the function button b1 is included in the sub menu m1 as well as in the sub menu m2. The determining unit 23 can recognize that the user authentication is required with reference to the authentication requirement information on the sub menu m1 that is set in the menu information table.

As a result of the above checking, when "authentication is required" has been set at least one, the determining unit 23 determines that the user authentication is required when the function f1 is executed (step 124). As a result of the determination, "authentication is required" is set (Y at step 125, step 126).

In FIG. 6, as it is determined that "authentication is required" in the user authentication requirement determination (Y at step 130), the user authentication unit 24 displays a predetermined authentication screen on the operating panel 13 for requiring the user authentication (step 140). When the user authentication has succeeded, the function f1 that is allocated to the function button b1 is executed (step 170).

If the user selects a function button b4, to which the function f4 is allocated, on the sub menu m2, the determining unit 23 next determines whether or not the user authentication is required in the manner shown below (steps 110, 120).

Specifically, referring to FIG. 7, when the operating button selected by the user is the function button b4 (Y at step 121) and not a combined function button (N at step 122), the determining unit 23 determines that the user authentication is required from the fact that "2" is set with reference to the authentication requirement information on the function button b4 that is set in the function button information table (step 124), and sets "authentication is required" as a result of the determination (Y at step 125, step 126).

In FIG. 6, as it is determined that "authentication is required" at the user authentication requirement determination (Y at step 130), the user authentication unit 24 requires the user authentication (step 140). When the user authentication has succeeded, the function f4 that is allocated to the function button b4 is executed (step 170).

If the user selects a function button b5 to which the function f5 is allocated on the sub menu m2, the determining unit 23 next determines whether or not the user authentication is required in a manner shown below (steps 110, 120).

Specifically, referring to FIG. 7, as the operating button selected by the user is the function button b5 (Y at step 121) and not a combined function button (N at step 122), the determining unit 23 can recognize that the user authentication is not required with reference to the authentication requirement information on the function button b5 that is set in the function button information table. In such a case, the determining unit 23 performs the same as in the case where the function button b1 is selected. That is, the determining unit 23 checks the presence of a combined function whose basic function is the function f5 that is allocated to the function button b5. In the example shown in FIG. 5, the function f5 is included in the combined function c3. If the determining unit 23 checks whether or not the user authentication is required for the combined function c3, it can recognize that the user authentication is not required. The determining unit 23 further checks the presence of a menu that includes the function button b5. Referring to the example shown in FIG. 4, the function button b5 is included in the sub menu m3 as well as in the sub menu m2. The determining unit 23 can recognize that the user authentication is not required with reference to the authentication requirement information on the sub menu m3 that is set in the menu information table.

As a result of the above, since "authentication is required" is not set to the function f5 itself, combined functions including the function f5, and menus including the function button b5, the determining unit 23 determines that the user authentication is not required when the function f5 is to be executed (step 124). As a result of the determination, "authentication is not required" is set (N at step 125, step 127).

In FIG. 6, as it is determined that "authentication is not required" in the user authentication requirement determination (N at step 130), the user authentication is skipped and the function f5 is executed (step 170).

If the user selects a function button b10, to which the combined function c2 is allocated, on the sub menu m2, the determining unit 23 next determines whether or not the user authentication is required in a manner shown below (steps 110, 120).

Specifically, referring to FIG. 7, as the operating button selected by the user is the function button b10 (Y at step 121) and also a combined function button (Y at step 122), the determining unit 23 breaks down the combined function c2 into the function f2 and the function f4 with reference to the basic function ID that is set in the function button information table (step 123). Then, the determining unit 23 determines whether or not the user authentication is required as mentioned above on each of the broken down basic functions.

First, the determining unit 23 can recognize that the user authentication is not required for the function f2, as the authentication is not required for the function f2 itself and the function f2 is not included in any other combined functions. "Authentication is required", however, is set to the sub menu m1 that includes the function button b2 to which the function f2 is allocated. As the user authentication is required when the function f2 is to be executed, whether or not the user authentication is required for the function f4, the determining unit 23 determines that the user authentication is required when the combined function c2 is to be executed (step 124). As a result of the determination, "authentication is required" is set (Y at step 125, step 126).

In FIG. 6, as it has been determined that "authentication is required" in the user authentication requirement determination (Y at step 130), the user authentication unit 24 requires the user authentication (step 140). When the user authentication has succeeded, the combined function c2 that is allocated to the function button b10 is executed (170). Basic functions of the combined function C2 are executed in the order set in the function button information table.

If the user selects a function button b11, to which the combined function c3 is allocated, on the sub menu m2, the determining unit 23 next determines whether or not the user authentication is required in the manner shown below (steps 110, 120).

Specifically, referring to FIG. 7, as the operating button selected by the user is the combined function button b11 (Y at step 121, Y at step 122), the determining unit 23 breaks down the combined function c3 into the function f5, the function f6 and the function f8, with reference to the basic function IDs which are set in the function button information table (step 123). Then, the determining unit 23 determines whether or not the user authentication is required as mentioned above on each of the broken down basic functions. First, for the function f5, the determining unit 23 can recognize that the user authentication is not required for the function f5 itself, that the function f5 is not included in any other combined functions, and that "authentication is not required" is also set for the sub menu m3 that includes the function button b5 to which the function f5 is allocated. As the user authentication is not required for the function f5 in each of the instances, the determining unit 23 recognizes that the user authentication is not required for the function f5. The determining unit 23 recognizes that the authentication is also not required for the function f6. For the function f8, the determining unit 23 can recognize that "authentication is required" from the authentication requirement information on the function f8. As result of the above, since the user authentication is required when the function f8 is executed, the determining unit 23 determines that the user authentication is required when the combined function c3 is executed (step 124). As a result of the determination, "authentication is required" is set (Y at step 125, step 126).

In FIG. 6, as it is determined that "authentication is required" in the user authentication requirement determination (Y at step 130), the user authentication unit 24 requires the user authentication (step 140). The user authentication is required before the combined function c3 is executed instead of when the function f8 is executed. When the user authentication has succeeded, the combined function c3 that is allocated to the function button b11 is executed (step 170).

If the user selects a function button b12, to which the combined function c4 is allocated, on the sub menu m2, the determining unit 23 next determines whether or not the user authentication is required in the manner shown below (steps 110, 120).

Specifically, referring to FIG. 7, as the operating button selected by the user is the combined function button b12 (Y at step 121, Y at step 122), the determining unit 23 breaks down the combined function c4 into the function f7 and the function f6 with reference to the basic function IDs which are set in the function button information table (step 123). Then, the determining unit 23 determines whether or not the user authentication is required as mentioned above on each of the broken down basic functions. First, for the function f7, the authentication is not required for the function f7 itself, the authentication is also not required for the combined function c1 that also includes the function f7, and there is no sub menu that includes the function button f7 to which the function f7 is allocated. Thus, as the user authentication is not required for the function f7 in each of the instances, the determining unit 23 recognizes that the user authentication is not required for the function f7. The determining unit 23 recognizes that the authentication is also not required for the function f6. As a result, as the user authentication is not required for both of the functions f7 and f6 comprising the combined function c4, the determining unit 23 determines that the user authentication is not required when the combined function c4 is executed (step 124). As a result of the determination, "authentication is not required" is set (N at step 125, step 127).

In FIG. 6, as it is determined that "authentication is not required" in the user authentication requirement determination (N at step 130), the user authentication is skipped and the function c3 is executed (step 170).

Then, it is assumed that a user who wants to use a function provided by the image processing apparatus 10 selects an operating button of the sub menu m3 on the main menu being displayed on the operating panel 13. As the description on the processes along with the flowcharts are the same as those described above, the description on the processes will be omitted as appropriate.

When the operating button of the sub menu m3 is selected on the main menu, the apparatus displays the sub menu m3 without requiring the user authentication as in the case of the sub menu m2, to which "0" indicating that the authentication is not required is set in the authentication requirement information, and waits for an operating instruction from the user.

If the user selects the function button b2 to which the function f2 is allocated, on the sub menu m3 after the apparatus enters the waiting state, it can be recognized for the function f2, although the authentication is not required for the function f2 itself, that "authentication is required" for the combined function c2 including the function f2, and that "authentication is required" is also set to the sub menu m1 including the function button b2 to which the function f2 is allocated. As a result, in response to the selection of the function button b2 on the sub menu m3, the user authentication is required, and then the function f2 is executed if the authentication succeeds.

If the user selects the function button b5 to which the function f5 is allocated, on the sub menu m3 after the apparatus enters the waiting state, for the function f5, the authentication is not required for the function f5 itself, and neither is the authentication required for the combined function c3 including the function f5, and the authentication is also not required for the sub menu m2 including the function button b5 to which the function f5 is allocated. As the apparatus recognizes that "authentication is not required" in each of the instances, it executes the function f5 without executing the user authentication.

If the user selects the function button b7 to which the function f7 is allocated, on the sub menu m3 after the apparatus enters the waiting state, it is determined that "authentication is not required" for the function f7, as the authentication is not required for the function f7 itself, there is no sub menu that includes the function button b7 to which the function f7 is allocated, and the authentication is not required for both of the combined functions c1 and c4, each of which includes the function f7. Therefore, the function f7 is executed without executing the user authentication. As the function button b9, to which the combined function c1 is allocated, is included in the sub menu m1 for which the user authentication is required, the apparatus may be adapted to execute the user authentication when the function f7 is executed for strictly maintaining the security.

If the user selects the function button b10 to which the combined function c2 is allocated, on the sub menu m3 after the apparatus enters the waiting state, the combined function c2 is executed after the user authentication is performed as "authentication is required" is set to the combined function c2 itself.

As mentioned above, the exemplary embodiment is adapted to execute the user authentication for a function if the user authentication is required for the function that is selected on a certain sub menu, even if the user authentication is not required for the same function that is selected on another sub menu. The exemplary embodiment is adapted to execute the user authentication if the user authentication is required for the combined function that is generated with the selected function as a basic function.

Figure 9:
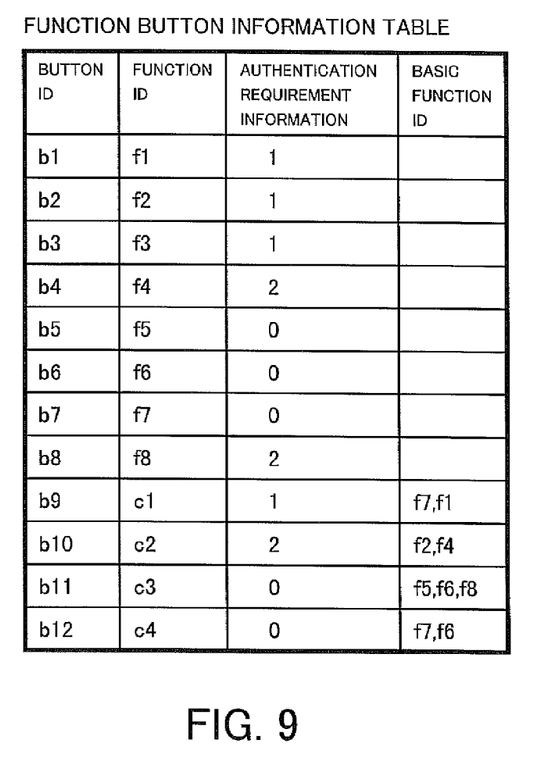
FIG. 9 is a diagram showing an exemplary setting where different authentication requirement information content is set for the function button information table in the exemplary embodiment.

In the exemplary embodiment, whether or not the user authentication is required is determined with reference to the menu information table and the function button information table which are generated when the screens are customized. For the function for which it is determined that "authentication is required" in the determination on whether or not the user authentication is required, the user authentication is also required thereafter. For the functions f1, f2, f3, and c1 which are executed in response to selection of the function button on the sub menu m1 for which the user authentication is required, the user authentication is to be required even when the functions are executed from another sub menu for which the user authentication is not required. Therefore, in such a case, it is convenient that "authentication is required" can be set in the authentication requirement information associated with the function concerned. FIG. 9 shows an exemplary setting of the function button information table in the case. Here, "1" indicating "authentication is required" is set in the authentication requirement information for easier distinction from the case where it is set in customizing.

Figure 10:
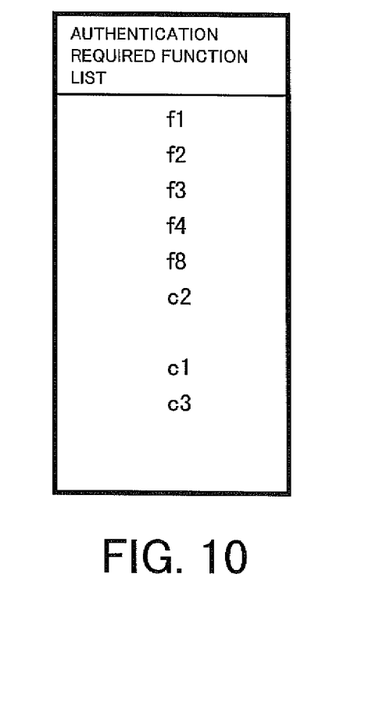
FIG. 10 is a diagram showing an exemplary authentication required function list table in the exemplary embodiment.

A table for registering a list of function buttons, for which the user authentication is required, may be provided independently instead of having the authentication requirement information included in the function button information table. FIG. 10 shows an example of the authentication required function list table.

Operations performed by a user to use the image processing apparatus 10 have been described. When the abovementioned functions are to be used in customizing, the operations proceed as below.

The customizing function unit 25 generates operating screens according to a user's operations to be customized, forms a hierarchical structure of the operating screens. When the user arranges desired function buttons on each operating screen and instructs whether or not the user authentication is required for each of the function buttons when the operating screens are generated, the customizing function unit 25 sets the menu information table and the function buttons according to the instructions. Here, it is assumed that the user arranges a function button (for example, the function button b1) on different operating screens (for example, the sub menus m1 and m2). As a result of the execution of the user authentication determination, if determination on whether or not the user authentication is required differs between the operating screens, such as the user authentication being required when the function f1 that is allocated to the function button b1 arranged on the sub menu m1 is executed, and the user authentication not being required when the function f1 is executed from the sub menu m2, the informing unit 28 informs the user of warning information indicating the presence of the difference. Specifically, it displays a message indicating as such on the operating panel 13.

The forbidding unit 29 not only informs the user of the inconsistency of the determination on whether the user authentication is required or not, but also forbids the customized setting. Specifically, the forbidding unit 29 prevents the setting from being saved.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a receiving unit that receives operation selection information selected by a user from an displayed operating screen, the operation selection information includes identification of an operation, the operation including a function or a combination of functions;
a detecting unit that detects a function corresponding to the operation selection information received by the receiving unit;
a memory that stores authentication requirement information en corresponding to if user authentication is required, the stored authentication requirement information including screen based authentication requirement information, for each operating screen, indicating if user authentication is required for selecting any operation associated with the displayed an operating screen, the stored authentication requirement information including function based authentication requirement information, for each function, indicating if user authentication is required for executing the function, the stored authentication requirement information including combined function based authentication requirement information, for each combination of functions, indicating if user authentication is required for executing the combination of functions;
a determining unit that determines if user authentication is required, based on the authentication requirement information that is stored in the memory, when an operation is selected by a user from the displayed operating screen;
a user authenticating unit that executes user authentication when the user selects an operation from the displayed operating screen for which it is determined that user authentication is required by the determining unit; and
a function executing unit that executes the operation selected by the user when the user is authorized to execute the operation;

the determining unit determining that user authentication is required when user authentication is set for a function included in the selected operation;

the determining unit determining that user authentication is required when user authentication is set for a combination of functions that includes a function included in the selected operation;

the determining unit determining that user authentication is required when user authentication is set for an operating screen that includes a function included in the selected operation or combination of functions that includes a function included in the selected operation.

2. The information processing apparatus according to claim 1, wherein the receiving unit receives operation selection information that is selected by the user on a plurality of operating screens in a hierarchical structure; and the determining unit determining that user authentication is required when user authentication is set for a function included in the selected operation;

the determining unit determining that user authentication is required when user authentication is set for a combination of functions that includes a function included in the selected operation;

the determining unit determining that user authentication is required when user authentication is set for a first operating screen that includes a function included in the selected operation;

the determining unit determining that user authentication is required when user authentication is set for a second operating screen that is at a higher layer than that of the first operating screen.

3. The information processing apparatus according to claim 2, further comprising: a customizing unit that customizes the operating screen; and an informing unit that informs the user of warning information that indicates that there is a difference, when the determining unit determines that requirement for user authentication differs between the function that is included in an operation that is customized and included in the operating screen and when user authentication is set for another operation having the function, included in the operation, detected by the detecting unit, when user authentication is set for the first operating screen that includes a function included in the selected operation, or when user authentication is set for the second operating screen at a higher layer than that of the first operating screen.

4. The information processing apparatus according to claim 2, further comprising:

a customize unit that customizes the operating screen; and a forbidding unit that forbids customizing of the operating screen, when the determining unit determines that requirement for user authentication differs between the function that is included in an operation that is customized and included in the operating screen and when user authentication is set for another operation having the function, included in the operation, detected by the detecting unit, when user authentication is set for the first operating screen that includes a function included in the selected operation, or when user authentication is set for the second operating screen at a higher layer than that of the first operating screen.

5. The information processing apparatus according to claim 1, wherein when the detecting unit detects the function corresponding to the operation selection, the determining unit determines if user authentication is required when the function is executed.

6. The information processing apparatus according to claim 5, wherein the determining unit sets the function that is determined as requiring the user authentication as an authentication required function.

7. The information processing apparatus according to claim 6, wherein when the operation, to which the function that has passed the user authentication by the user authentication unit is allocated, is selected by the user again, the determining unit determines that user authentication is not required.

8. A non-transitory computer readable recording medium storing a program causing a computer to execute processes for:

receiving operation selection information selected by a user from a displayed operating screen, the operation selection information includes identification of an operation, the operation including a function or a combination of functions;

detecting a function corresponding to the operation selection information received at the receiving process;

storing authentication requirement information en corresponding to if user authentication is required, the stored authentication requirement information including screen based authentication requirement information, for each operating screen, indicating if user authentication is required for selecting any operation associated with the displayed an operating screen, the stored authentication requirement information including function based authentication requirement information, for each function, indicating if user authentication is required for executing the function, the stored authentication requirement information including combined function based authentication requirement information, for each combination of functions, indicating if user authentication is required for executing the combination of functions;

determining if user authentication is required, based on the authentication requirement information that is stored in the memory, when an operation is selected by a user from the displayed operating screen;

executing user authentication when the user selects an operation from the displayed operating screen for which it is determined that user authentication is required in the determining process; and executing the operation selected by the user when the user is authorized to execute the operation;

wherein the determining process determines that user authentication is required when user authentication is set for a function included in the selected operation;

wherein the determining process determines that user authentication is required when user authentication is set for a combination of functions that includes a function included in the selected operation;

wherein the determining process determines that user authentication is required when user authentication is set for an operating screen that includes a function included in the selected operation or combination of functions that includes a function included in the selected operation.

9. An information processing system comprising:

a receiving unit that receives operation selection information selected by a user from an displayed operating screen, the operation selection information includes identification of an operation, the operation including a function or a combination of functions;

a detecting unit that detects a function corresponding to the operation selection information received by the receiving unit;

a memory that stores authentication requirement information corresponding to if user authentication is required, the stored authentication requirement information including screen based authentication requirement information, for each operating screen, indicating if user authentication is required for selecting any operation associated with the displayed operating screen, the stored authentication requirement information including function based authentication requirement information, for each function, indicating if user authentication is required for executing the function, the stored authentication requirement information including combined function based authentication requirement information, for each combination of functions, indicating if user authentication is required for executing the combination of functions;

a determining unit that determines if user authentication is required, based on the authentication requirement information that is stored in the memory, when an operation is selected by a user from the displayed operating screen;

a user authenticating unit that executes user authentication when the user selects an operation from the displayed operating screen for which it is determined that user authentication is required by the determining unit; and a function executing unit that executes the operation selected by the user when the user is authorized to execute the operation;

the determining unit determining that user authentication is required when user authentication is set for a function included in the selected operation;

the determining unit determining that user authentication is required when user authentication is set for a combination of functions that includes a function included in the selected operation;

the determining unit determining that user authentication is required when user authentication is set for an operating screen that includes a function included in the selected operation or combination of functions that includes a function included in the selected operation the function executing part to which the function is allocated.

10. An information processing method comprising:

receiving operation selection information selected by a user from a displayed operating screen, the operation selection information includes identification of an operation, the operation including a function or a combination of functions;

detecting, using a processor, a function corresponding to the operation selection information received at the receiving process;

storing, in a memory, authentication requirement information en corresponding to if user authentication is required, the stored authentication requirement information including screen based authentication requirement information, for each operating screen, indicating if user authentication is required for selecting any operation associated with the displayed operating screen, the stored authentication requirement information including function based authentication requirement information, for each function, indicating if user authentication is required for executing the function, the stored authentication requirement information including combined function based authentication requirement information, for each combination of functions, indicating if user authentication is required for executing the combination of functions;

judging if user authentication is required, based on the authentication requirement information that is stored in the memory, when an operation is selected by a user from the displayed operating screen;

executing user authentication when the user selects an operation from the displayed operating screen that is judged as requiring user authentication; and executing the operation selected by the user when the user is authorized to execute the operation;

wherein, in the judging, it is judged that user authentication is required when user authentication is set for a function included in the selected operation;

wherein, in the judging, it is judged that user authentication is required when user authentication is set for a combination of functions that includes a function included in the selected operation;

wherein, in the judging, it is judged that user authentication is required when user authentication is set for an operating screen that includes a function included in the selected operation or combination of functions that includes a function included in the selected operation.

11. An information processing apparatus comprising:

a receiving unit that receives operation selection information selected by a user from an displayed operating screen, the operation selection information includes identification of an operation, the operation including a function or a combination of functions;

a detecting unit that detects a part corresponding to the operation selection information received by the receiving unit;

a memory that stores authentication requirement information corresponding to if user authentication is required, the stored authentication requirement information including screen based authentication requirement information, for each operating screen, indicating if user authentication is required for selecting any operation associated with the displayed operating screen, the stored authentication requirement information including function based authentication requirement information, for each function, indicating if user authentication is required for executing the function, the stored authentication requirement information including combined function based authentication requirement information, for each combination of functions, indicating if user authentication is required for executing the combination of functions;

a determining unit that determines if user authentication is required, based on the authentication requirement information that is stored in the memory, when an operation is selected by a user from the displayed operating screen;

a user authenticating unit that executes user authentication when the user selects an operation from the displayed operating screen for which it is determined that user authentication is required by the determining unit; and a function executing unit that executes the operation selected by the user when the user is authorized to execute the operation;

the determining unit determining that user authentication is required when user authentication is set for a function included in the selected operation;

the determining unit determining that user authentication is required when user authentication is set for a combination of functions that includes a function included in the selected operation;

the determining unit determining that user authentication is required when user authentication is set for an operating screen that includes a function included in the selected operation or combination of functions that includes a function included in the selected operation;

the determining unit determining, when the operation that is detected by the detecting unit is a combination of a plurality of basic functions, if user authentication is required for each of the basic functions;

the determining unit determining, when at least one of the basic functions requires user authentication, that the selected operation requires user authentication.

12. A non-transitory computer readable recording medium storing a program causing a computer to execute processes for:

receiving operation selection information selected by a user from an displayed operating screen, the operation selection information includes identification of an operation, the operation including a function or a combination of functions;

detecting a function corresponding to the operation selection information received at the receiving process;

storing authentication requirement information corresponding to if user authentication is required, the stored authentication requirement information including screen based authentication requirement information, for each operating screen, indicating if user authentication is required for selecting any operation associated with the displayed operating screen, the stored authentication requirement information including function based authentication requirement information, for each function, indicating if user authentication is required for executing the function, the stored authentication requirement information including combined function based authentication requirement information, for each combination of functions, indicating if user authentication is required for executing the combination of functions;

determining if user authentication is required, based on the authentication requirement information that is stored in the memory, when an operation is selected by a user from the displayed operating screen;

executing user authentication when the user selects an operation from the displayed operating screen for which it is determined that user authentication is required in the determining process; and executing the operation selected by the user when the user is authorized to execute the operation;

wherein the user authentication determining process determines that user authentication is required when user authentication is set for a function included in the selected operation;

wherein the user authentication determining process determines that user authentication is required when user authentication is set for a combination of functions that includes a function included in the selected operation;

wherein the user authentication determining process determines that user authentication is required when user authentication is set for an operating screen that includes a function included in the selected operation or combination of functions that includes a function included in the selected operation;

determining, when the operation is a combination of a plurality of basic functions, if user authentication is required for each of the basic functions; and wherein the user authentication determining process determines that user authentication is required, when at least one of the basic functions requires user authentication.

13. An information processing system comprising:

a receiving unit that receives operation selection information selected by a user from a displayed operating screen, the operation selection information includes identification of an operation, the operation including a function or a combination of functions;

a detecting unit that detects a function corresponding to the operation selection information received by the receiving unit;

a memory that stores authentication requirement information corresponding to if user authentication is required, the stored authentication requirement information including screen based authentication requirement information, for each operating screen, indicating if user authentication is required for selecting any operation associated with the displayed operating screen, the stored authentication requirement information including function based authentication requirement information, for each function, indicating if user authentication is required for executing the function, the stored authentication requirement information including combined function based authentication requirement information, for each combination of functions, indicating if user authentication is required for executing the combination of functions;

a determining unit that determines if user authentication is required, based on the authentication requirement information that is stored in the memory, when an operation is selected by a user from the displayed operating screen;

a user authenticating unit that executes user authentication when the user selects an operation from the displayed operating screen for which it is determined that user authentication is required by the determining unit; and a function executing unit that executes the operation selected by the user when the user is authorized to execute the operation;

the determining unit determining that user authentication is required when user authentication is set for a function included in the selected operation;

the determining unit determining that user authentication is required when user authentication is set for a combination of functions that includes a function included in the selected operation;

the determining unit determining that user authentication is required when user authentication is set for an operating screen that includes a function included in the selected operation or combination of functions that includes a function included in the selected operation;

the determining unit determines, when the operation that is detected by the detecting unit is a combination of a plurality of basic functions, if user authentication is required for each of the basic functions;

the determining unit determines, when at least one of the basic functions requires user authentication, that the selected operation requires user authentication.

14. An information processing method comprising:

receiving operation selection information selected by a user from an displayed operating screen, the operation selection information includes identification of an operation, the operation including a function or a combination of functions;

detecting, using a processor, a function corresponding to the operation selection information received at the receiving process;

storing, in a memory, authentication requirement information on corresponding to if user authentication is required, the stored authentication requirement information including screen based authentication requirement information, for each operating screen, indicating if user authentication is required for selecting any operation associated with the displayed operating screen, the stored authentication requirement information including function based authentication requirement information, for each function, indicating if user authentication is required for executing the function, the stored authentication requirement information including combined function based authentication requirement information, for each combination of functions, indicating if user authentication is required for executing the combination of functions;

judging if user authentication is required, based on the authentication requirement information that is stored in the memory, when an operation is selected by a user from the displayed operating screen;

executing user authentication when the user selects an operation from the displayed operating screen that is judged as requiring user authentication; and executing the operation selected by the user when the user is authorized to execute the operation;

wherein, in the judging, it is judged that user authentication is required when user authentication is set for a function included in the selected operation;

wherein, in the judging, it is judged that user authentication is required when user authentication is set for a combination of functions that includes a function included in the selected operation;

wherein, in the judging, it is judged that user authentication is required when user authentication is set for an operating screen that includes a function included in the selected operation or combination of functions that includes a function included in the selected operation;

determining, when the operation is a combination of a plurality of basic functions, if user authentication is required for each of the basic functions; and determining, when at least one of the basic functions requires user authentication, that the selected operation requires user authentication.

* * * * *